United States Patent [19]

Zychowski

[11] Patent Number: 4,661,550

[45] Date of Patent: * Apr. 28, 1987

[54] THERMOSETTING VINYL ACETATE COPOLYMER COATINGS

[75] Inventor: Edwin A. Zychowski, Des Plaines, Ill.

[73] Assignee: DeSoto, Inc., Des Plaines, Ill.

[ * ] Notice: The portion of the term of this patent subsequent to Apr. 3, 2001 has been disclaimed.

[21] Appl. No.: 696,573

[22] Filed: Jan. 30, 1985

[51] Int. Cl.$^4$ ............................................... C08K 5/06
[52] U.S. Cl. ..................................... 524/376; 524/100;
524/512; 524/755; 524/761; 524/853
[58] Field of Search ............... 524/100, 376, 512, 558,
524/853, 755, 761; 526/317

[56] References Cited

U.S. PATENT DOCUMENTS

| | | | |
|---|---|---|---|
| 3,208,963 | 9/1965 | Jasinski | 524/558 |
| 3,763,117 | 10/1973 | McKenna et al. | 524/558 |
| 3,926,888 | 12/1975 | Cheung et al. | 524/512 |
| 4,126,595 | 11/1978 | Martorano et al. | 524/512 |
| 4,338,379 | 7/1982 | Strolle et al. | 524/512 |
| 4,440,894 | 4/1984 | Zychowski et al. | 524/390 |

Primary Examiner—Joseph L. Schofer
Assistant Examiner—J. M. Reddick
Attorney, Agent, or Firm—Dressler, Goldsmith, Shore, Sutker & Milnamow

[57] ABSTRACT

A thermosetting solvent solution coating composition is disclosed in which a solution copolymer of copolymerized monomers consisting essentially of from 55% to 75% of vinyl acetate, from 15% to 40% of $C_2$–$C_8$ alkyl acrylate or methacrylate, from 3% to 10% of $C_2$–$C_4$ hydroxyalkyl acrylate or methacrylate, and from about 0.5% to about 5% of monoethylenically unsaturated copolymerizable carboxylic acid if formed by copolymerization in organic solvent solution medium consisting essentially of $C_1$–$C_8$ alkoxy $C_2$–$C_4$ alkanol at a solids content of at least about 75% and at an average temperature of from 95° C. to 105° C. at which reflux does not occur. This copolymer is used in admixture with from 8% to 20%, based on the mixture, of polyalkoxymethyl melamine in which a volatile alcohol provides the alkoxy groups. The new copolymer can be produced more rapidly and more reproducibly than when butanol is used, and it provides as good to better properties in a cured film.

13 Claims, No Drawings

THERMOSETTING VINYL ACETATE COPOLYMER COATINGS

DESCRIPTION

1. Technical Field

This invention relates to thermosetting solvent solution coatings for application to metal substrates to provide hard, flexible and glossy finishes adapted to sustain extended exterior exposure. The invention includes the method of producing the copolymers used in these coatings.

2. Background Art

The provision of thermosetting solution coating compositions possessing good film properties and adapted to sustain exterior exposure using copolymers containing more than 50% of vinyl acetate is difficult, as pointed out in U.S. Pat. No. 4,440,894. In that patent it was found to be necessary to copolymerize from 55% to 75% of vinyl acetate with 15% to 40% of $C_2$–$C_8$ alkyl acrylate or methacrylate, from 3% to 10% of $C_2$–$C_4$ hydroxyalkyl acrylate or methacrylate, and from about 0.5% to about 5% of copolymerizable monoethylenically unsaturated carboxylic acid in organic solvent solution medium consisting essentially of a butanol at a solids content of at least 65%, so that the resulting copolymer could be incorporated in a solution coating composition which would cure to provide good film properties when in admixture with from 8% to 20%, based on the weight of the mixture, of a polyalkoxymethyl melamine with a volatile alcohol. In contrast, when 2-butoxy ethanol was used in place of the butanol in the reflux copolymerization of the patent, the copolymer was of lower molecular weight. In the cured film, the solvent resistance fell off from 100 to 10 double rubs with a methyl ethyl ketone-saturated cloth, 40 inch-pounds of reverse impact testing produced cracks not present when the butanol system was tested, the pencil hardness of the cured coatings fell off from F-H to B, the T bend flex test bending around a single thickness of the metal substrate produced pick off not present when the butanol system was tested, the mar resistance fell off from good to fair, and the 60° gloss percentage fell off from 81 to 60.

The superiority of the butanol system in U.S. Pat. No. 4,440,894 was clear, but copolymer production was slow, normally taking from 12 to 13 hours. Also, the product properties were marginal and varied from one batch to the next, so an occasional batch would not meet specifications. An effect was therefor made to speed copolymer production while retaining or even improving the good performance previously obtained only when butanol was used. Uniformity of product performance is another important factor.

DISCLOSURE OF INVENTION

In accordance with this invention, it has been found that when from 55% to 75% of vinyl acetate is copolymerized in organic solvent solution medium consisting essentially of $C_1$–$C_8$ alkoxy $C_2$–$C_4$ alkanol at a solids content of at least about 75% (solids content is measured when all monomers are present) and at an average temperature of from 95° C. to 105° C. at which reflux does not occur, with from 15% to 40% of $C_2$–$C_8$ alkyl acrylate or methacrylate, from 3% to 10% of $C_2$–$C_4$ hydroxyalkyl acrylate or methacrylate, and from about 0.5% to about 5% of monoethylenically unsaturated copolymerizable carboxylic acid, the copolymer product is of the same or higher molecular weight than when butanol was previously used.

Other advantages are also obtained. The monomers are more uniformly distributed in the copolymer. Moreover, polymerization is more rapid in the alkoxy alkanol solvent, so the time required to produce a batch of copolymer is reduced and the product is more uniform from one batch to the next. When this solution copolymer product is mixed with 8% to 20% of a polyalkoxymethyl melamine to provide a thermosetting solution coating composition containing the copolymer and the melamine dissolved in organic solvent, cured films made by coating and baking that composition are as good (usually better) than those produced in accordance with the teachings of U.S. Pat. No. 4,440,894.

To assist understanding the foregoing description, the preferred alkoxy alkanol solvent is 2-butoxy ethanol, the preferred alkyl acrylate is butyl acrylate, the preferred hydroxyalkyl acrylate is 2-hydroxyethyl acrylate, and the preferred carboxylic acid is acrylic acid.

It is desired to point out that using butanol as solvent in accordance with U.S. Pat. No. 4,440,894, the polymerization is carried out at reflux temperature at atmospheric pressure. Since the temperature is now established by reflux conditions, and since this is determined by the butanol solvent and the proportion of vinyl acetate, the temperature tends to be depressed below about 100° C. As the temperature goes down, the vinyl acetate polymerizes poorly in the butanol solvent and tends to accumulate, thus further lowering the reflux temperature and the rate of polymerization. The result is an increase in molecular weight and a reduction in the uniformity of distribution of the monomers within the copolymer.

In the past, when 2-butoxy ethanol was substituted for the butanol, the monomers reacted more quickly and the reflux temperature went up, both as a result of the higher boiling point of the 2-butoxy ethanol and also because of the decreased accumulation of vinyl acetate. In the patent Example 2 using 2-butoxy ethanol, the reflux temperature went up to about 110° C. The result was a product of lowered molecular weight which was inferior as established in the patent.

When we now use an alkoxy alkanol solvent and go to still higher solids content while using cooling to prevent the temperature from exceeding an average of 105° C., we get a faster reaction, a more uniform distribution of the monomers in the copolymer, and adequate molecular weight.

The result, in a thermosetting solvent solution coating composition containing the usual proportion of the same melamine curing agent, is a cured coating having the same solvent resistance and impact resistance, but the coatings are somewhat harder, the F-H pencil hardness obtained in the patent being increased to H. This perceptible increase in hardness is obtained without loss of flexibility and impact resistance. Since these characteristics are antagonistic to one another, the product is now generally better, the marginal character of its acceptability is diminished, and the increased uniformity from one batch to the next has substantially eliminated unacceptable batches. Also, the more rapid reduction now obtained allows an entire batch to be completed in about 8 hours, a single shift, while the previous 12 to 13 hour batches required that a second shift come in to finish a batch started by the shift before it. This transfer of responsibility for a product is not desirable.

The polymers used herein are solution copolymers, which means that the monomers are dissolved in an organic solvent and polymerized in solution to form a solvent-soluble copolymer. The coating compositions of this invention contain the copolymers in organic solvent solution. The copolymerization must be carried out at the specified high solids content and the solvent medium must consist essentially of an alkoxy alkanol, as defined hereafter, to provide the rapid reaction and superior monomer distribution which is a feature of this invention. At the same time, the temperature must be prevented from going too high until substantially all the monomers have been introduced into the reaction medium.

The alkoxy alkanol solvents are generally $C_1$-$C_8$ alkoxy $C_2$-$C_4$ alkanols, alkoxy ethanols, being preferred. Thus, one can use 2-ethoxy ethanol, 1-ethoxy propanol, 2-propoxy ethanol, 1-propoxy propanol, 2-butoxy ethanol, 2-hexoxy ethanol, 2-ethoxy butanol, and the like. The invention will be illustrated using 2-butoxy ethanol, which is presently preferred.

It will be appreciated that the polymerization under consideration is carried out by slowly adding a mixture of monomers to the solvent which is maintained at reaction temperature. The slow addition of monomer is essential in order to control the exothermic polymerization and to prevent the build up of unreacted monomers which can produce an explosion. The customary addition is over a period of 5 hours with 20% of the total monomers being added each hour. Under these conditions, and using butanol in the process of the patent, at the end of the first hour only 40% of the monomers had been converted to copolymer. In this invention at the end of the first hour 60% of the monomers had been so converted. Using butanol in the process of the patent, at the end of five hours, when all the monomers had been added to the reactor, from 80-85% of the monomers had been converted to copolymer, but in this invention it is typically found that 90% of the monomers had been so-converted. As a result, a 2-3 hour holding time is needed in this invention after monomer addition is complete to obtain less than 0.5% of unreacted monomer in the product, while from 6-8 hours was usually needed in the butanol process. The reaction temperature may be increased after monomer addition has been completed without detriment in this invention, so the average temperature is here defined to include only the temperature which is measured during that period of the polymerization in which the first 90% of the monomer conversion occurs.

Referring more particularly to the solvent, the language consisting essentially is intended to describe at least about 75%, preferably at least about 90%, of the solvent medium which is used during the copolymerization. Other solvents, such as xylene, may be added after the polymerization is complete in order to provide the solvent content of the final solution coating composition, and commercial mixtures of aromatic hydrocarbons are commonly used for this purpose.

The copolymerization is conventional from the standpoint that the monomers are added slowly to the solvent which is maintained at polymerization temperature, the usual free radical polymerization catalysts being used, such as benzoyl peroxide, cumene hydroperoxide or azobisisobutyronitrile. These are desirably used in admixture with one another, as illustrated in the Example hereinafter.

The temperature conditions are important to this invention, and since the polymerization reaction is exothermic, one must employ cooling to maintain the 95° C. to 105° C. temperature which is needed herein while the bulk of the polymerization takes place. At lower temperatures, the reaction rate falls off. At higher temperatures the molecular weight falls off. If cooling is not employed, the temperature tends to rise above 105° C. until the cooling provided by refluxing serves to limit the temperature Refluxing is avoided in this invention since it removes monomers along with the solvent, and this leads to variation in product performance from one batch to the next.

In U.S. Pat. No. 4,440,894 the solids content during the polymerization is at least 65%, preferably from 70% to 75%. In this invention, the solids content should be at least 75%, and is preferably higher, up to about 85%. From 75% to 80% solids content represents preferred practice herein. The upper limit of 75% in the patent is due to the limited solubilizing capacity of the butanol, the alkoxy alkanols used herein being better solvents. Also, the catalysts must be in solution to be effective, and butanol does not well dissolve these catalysts, so xylene is used to help solubilize preferred catalysts in commercial practice. In this invention, the catalysts are soluble in the alkoxy alkanols used herein, so it is not necessary to use two solvents.

Referring more particularly to the monoethylenic monomers which are copolymerized, from 55% to 75% of the monomers are constituted by vinyl acetate. Preferred proportions are from 60% to 72%.

The alkyl acrylate or methacrylate component is preferably used in an amount of from 20% to 30%. While a butyl acrylate is preferred, illustrated herein by n-butyl acrylate, other monomers within the defined class are illustrated by ethyl acrylate, isobutyl acrylate, n-butyl and isobutyl methacrylate, and 2-ethylhexyl acrylate.

The hydroxy alkyl acrylate or methacrylate is a costly component, so proportions thereof in excess of 10% are undesirable. The preferred hydroxy-functional monomer is 2-hydroxyethyl methacrylate which is preferably used in an amount of from 6% to 9%. 2-hydroxybutyl acrylate and 2-hydroxypropyl methacrylate will further illustrate these hydroxy-functional monomers.

At least about 0.5% of monoethylenic carboxylic acid is need for desired gloss, preferably from 1% to 3% therefor. Acrylic acid is the preferred acid, but methacrylic acid and crotonic acid will further illustrate useful copolymerizable carboxylic acids.

The polyalkoxymethyl melamine should have at least about three alkoxymethyl groups. Hexamethoxymethyl melamine is useful, as are similar compounds in which a proportion of the amino hydrogen groups in the melamine moiety is left unreacted. Any volatile monohydric alcohol may be used to provide the alkoxy portion of the alkoxymethyl group, methyl and/or ethyl alcohols being preferred. This component is preferably used in an amount of 10% to 15%, and polymethoxymethyl melamines are best.

The compositions of this invention are thinned to coating viscosity, and this is conveniently done by the addition of aromatic hydrocarbons which are available in commercial mixtures, as illustrated in the Example.

The coating compositions of this invention are normally pigmented, especially with titanium dioxide, rutile. Typical pigmentation involves a pigment to binder ratio of 0.4:1 to 1.5:1, preferably 0.6:1 to 1.2:1.

The coatings of this invention may be applied in any desired fashion, as by air, electrostatic or other type of spray, or by roller coating, and any surface may be coated, especially metal surfaces, such as steel and aluminum. The applied coatings are usually baked to cure the same using baking conditions is from 30 seconds to 1 hour at a temperature of from 550°0 F. to 300° F., the faster times being at the higher temperatures.

Throughout this application, all proportions are by weight, unless otherwise specified. The invention is illustrated in the following Example of presently preferred practice.

EXAMPLE 13.95 parts of 2-butoxy ethanol are heated to 100° C. in a reactor. A monomer mixture is prepared containing 63.8 parts of vinyl acetate, 27.4 parts of butyl acrylate, 7.0 parts of 2-hydroxy methacrylate and 1.8 parts of acrylic acid. An initiator solution is prepared containing 0.6 part of benzoyl peroxide and 0.6 part of t-butyl perbenzoate dissolved in 14.0 parts of 2-butoxy ethanol. The monomer mixture and the initiator solution are each separately and slowly fed to the reactor at uniform rates such that 20% of each are supplied per hour. In this way, all of the monomers and all of the initiator are introduced over a 5 hour period. The reactor is cooled to maintain an average temperature of about 100° C. After all of the monomers are present in the reactor, it was determined that 90% of the monomers had been converted to copolymer. The temperature was then increased to 110° C. to hasten completion of polymerization which was discontinued after residual unreacted monomer had been reduced to less than 0.5% based on polymer solids. This occured after about 3 hours.

The reactor contents were then cooled to 50° C. and 14.0 parts of SC-150 (a commercial mixture of aromatic hydrocarbon solvents) were added to thin the solution to approximately 65% solids content. The polymer solution at room temperature had a viscosity of 48 poise. 150 parts of the above polymer solution were combined with 60 parts of SC-150 and 300 parts of titanium dioxide, rutile, and the mixture is ground to a grind rating of 7 to 7½ on the North Shore scale. This grind is then let down with 275 parts of the solution of Example 1, 175 parts of SC-150 and 50 parts of a polymethoxymethyl melamine having a large residual —NH content. The American Cyanamid Co. product 325 may be used for this last-named component.

The product has a #4 Zahn cup viscosity of 25 seconds and was applied by a #34 wire wound rod onto aluminum panels. The coated panels were baked in a 520° F. oven for 30 seconds, attaining a peak metal temperature of 450° F.

The cured coatings had a pencil hardness of H, they passed 100 double rubs with a methyl ethyl, ketone-saturated cloth, and exhibited the same good flexibility and impact resistance achieved in successful runs using the teachings of U.S. Pat. No. 4,440,894. The cured coatings of this invention are thus the full equivalent of those produced in U.S. Pat. No. 4,440,894, but are somewhat harder, and thus more acceptable.

A repeat of this Example using the butanol process of the patent produced about the same properties except for a pencil hardness of only F-H.

What is claimed is:

1. A thermosetting solvent solution coating composition comprising organic solvent having dissolved therein a solution copolymer of copolymerized monomers consisting essentially of from 55% to 75% of vinyl acetate, from 15% to 40% of $C_2$–$C_8$ alkyl acrylate or methacrylate, from 3% to 10% of $C_2$–$C_4$ hydroxyalkyl acrylate or methacrylate, and from about 0.5% to about 5% of monoethylenically unsaturated copolymerizable carboxylic acid, said monomers being copolymerized in organic solvent solution medium consisting essentially of $C_1$–$C_8$ alkoxy $C_2$–$C_4$ alkanol at a solids content of at least about 75% and at an average temperature of from 95° C. to 105° C. at which reflux does not occur, said copolymer being in admixture with from 8% to 20%, based on the mixture, of polyalkoxymethyl melamine in which a volatile alcohol provides the alkoxy groups.

2. A coating composition as recited in claim 1 in which at least about 90%, of the solvent medium which is used during the copolymerization is constituted by said alkoxy alkanol.

3. A coating composition as recited in claim 2 in which the copolymerization is carried out at from 75% to 80% solids content.

4. A coating composition as recited in claim 2 in which an alkoxy ethanol is employed.

5. A coating composition as recited in claim 4 in which butoxy ethanol is employed.

6. A coating composition as recited in claim 1 in which vinyl acetate is used in an amount of from 60% to 72%.

7. A coating composition as recited in claim 1 in which the alkyl acrylate or methacrylate component is used in an amount of from 20% to 30%.

8. A coating composition as recited in claim 7 in which a butyl acrylate is employed.

9. A coating composition as recited in claim 1 in which said hydroxyalkyl monomer is 2-hydroxyethyl methacrylate.

10. A coating composition as recited in claim 9 in which said hydroxyethyl methacrylate is used in an amount of from 6% to 9%.

11. A coating composition as recited in claim 1 in which said carboxylic acid is acrylic acid used in amount of from 1% to 3%.

12. A coating composition as recited in claim 1 in which the melamine component is a polymethoxymethyl melamine present in an amount of 10% to 15% of the mixture.

13. A coating composition as recited in claim 1 in which said composition is pigmented in a pigment to binder weight ratio of 0.4:1 to 1.5:1.

* * * * *